United States Patent [19]

Bachinger et al.

[11] Patent Number: 4,993,017
[45] Date of Patent: Feb. 12, 1991

[54] MODULARLY STRUCTURED ISDN COMMUNICATION SYSTEM

[75] Inventors: Gerhard Bachinger, Sauerlach; Thomas Barkmeyer, Munich; Ehrard Kroesa, Groebenzell; Wolfgang Siegmund, Munich; Bernhard Werres, Graefelfing, all of Fed. Rep. of Germany

[73] Assignee: Siemens Aktiengesellschaft, Berlin and Munich, Fed. Rep. of Germany

[21] Appl. No.: 313,508

[22] Filed: Feb. 22, 1989

[30] Foreign Application Priority Data

Mar. 15, 1988 [DE] Fed. Rep. of Germany ....... 3808639
Sep. 30, 1988 [DE] Fed. Rep. of Germany ....... 3833351

[51] Int. Cl.⁵ .............................................. H04Q 11/04
[52] U.S. Cl. ...................................... 370/58.2; 370/60
[58] Field of Search ...................... 370/60, 60.1, 58.1, 370/58.2, 58.3, 94.1, 94.2, 94.3, 67, 66

[56] References Cited

U.S. PATENT DOCUMENTS 4,903,258  2/1990  Kuhlmann et al. ................. 370/58.2

OTHER PUBLICATIONS

"ISDN in the Office -HICOM", Technology and Applications of the HICOM ISDN Communication System, Special Issue Telcom Report and Siemens magazine COM, Dec. 1985, ISBN 3-8009-3846-4, pp. 4-111.
"High Performance Microprocessor with Integrated Memory Management", Intel Corporation, Oct. 1985, No. 231630-001.

Primary Examiner—Douglas W. Olms
Assistant Examiner—Wellington Chin
Attorney, Agent, or Firm—Hill, Van Santen, Steadman & Simpson

[57] ABSTRACT

A modularly structured ISDN communication system has a system processor that is administered by a multitasking real-time operating system. Since this operating system can only assign system-internal function programs to the system processor (on-line system), a software application module having a time-sharing operating system is provided, so that the same processor can be administered by both operating systems. In order to effect this, one task of the real-time operating system is fashioned as a sluice sub-system SUB in which an allocation switch from the addressing tables of the real-time operating system onto those of the time-sharing operating system occurs. An interrupt transition routine that leads back into the sluice sub-system SUB in which the allocation switch is in turn cancelled is present in the time-sharing operating system for a processing of interrupt requests. Messages can be forwarded from one operating system to the other by use of an intercommunication data segment, so that data from the administration of the one operating system can be transferred into that of the other operating system in a simple manner.

13 Claims, 11 Drawing Sheets

MODULARLY STRUCTURED ISDN COMMUNICATION SYSTEM

BACKGROUND OF THE INVENTION

The present invention is directed to a modularly structured ISDN (Integrated Services Digital Network) communication system.

Such modularly structured digital communication systems provide for connection of terminal equipment having a variety of performance features to one another and for the connection of such terminal equipment to communication networks, particularly public networks.

A communication system wherein, among other things, digital telephones, telecopiers, videotext stations and picture screen stations are connectable is disclosed in an article entitled "Telcom Report"—ISDN im Buero—1985 ISBN No. 3-8009-3846-4, Siemens AG.

In addition to a line switching unit to which these equipment are connected, what is referred to as an organizational data server unit that encompasses a system-operations-oriented function complex as well as various, optional data application functions are attributed to the modules of the communication system. The data application functions can be loaded and then activated. A special data server that can be used only for data applications can be integrated into the system instead of the organizational data server unit or in addition thereto. In this context, significant data application functions are as follows:

Data Transport Functions

These functions comprise the transport of various types of data between the actual communication system and local or remote data manipulation and data processing systems. Included among such data to be transmitted are, among others, call charge data, traffic statistics data as well as different system and user data files.

Data Acquisition Functions

These functions serve for establishing, manipulating and erasing data files on different data carriers for the purpose of data acquisition. This occurs, for example, in conjunction with call record journaling for charge calculation as well as in conjunction with the acquisition of traffic-statistical data for monitoring the system work load.

Data Manipulation Functions

Included, for example, among such manipulation functions are the editing of call charge data based on different user-associated criteria for output on terminals and data carriers.

All of these data application functions are realized by software processes that are implemented in the organizational data server unit or in a special data server. The individual units or servers are integrated in terms of organization and dependability. This is especially facilitated by a technological integration in the form of uniform processors, operating systems and memories in the servers.

A modification of a prior art operating system iRMX 286 is provided as an operating system for this communication system, the critical criteria being "multi-tasking" and "multi-programming". This operating system is included in the type of systems referred to as real-time operating systems.

Some wide spread operating systems that are generally referred to as time sharing systems in view of their typical function structure are known for other computer systems, particularly in the area of personal computers and of multi-station systems as well as of large data processing systems. A multitude of a great variety of application programs that are independent from the system on which they operate are available for such operating systems.

SUMMARY OF THE INVENTION

An object of which the present invention is to insert a time sharing operating system into a communication system such that data applications conducted under the time sharing operating system can be inserted into the communication system without additional modifications and such that data and data applications administered by the real-time operating system can be given priority over access to the time sharing operating system.

The present invention is used in a modularly structured ISDN communication system, having at least one switching unit, to which equipment and networks are connectable via periphery modules and that has a switching matrix array.

The communication system also has a memory-programmed system processor that has a real-time operating system, for controlling the access to the system resources, the communication between program sub-systems and the reaction to stimuli (interrupt handling).

The real-time operating system also has an information transport system eminent in the operating system having program sub-system-associated input and output memories operated mailbox-like for message to and from program sub-systems.

The communication system further has a system memory with memory segments addressable via descriptors for storing data files and the program sub-systems and has a system table memory that contains system table descriptors referenced to the memory segments of the real-time operating system.

The present invention is composed of an application module having a time-sharing operating system, having a program sub-system fashioned as a sluice sub-system, and having a module table memory that contains module table descriptors referenced to memory segments of the time-sharing operating system under which at least a time-sharing status segment descriptor referenced to a status segment of the time-sharing operating system intermediately stores system processor data.

It also contains a time-sharing code segment descriptor referenced to the code segment of an interrupt transition routine of the time-sharing operating system and further contains communication descriptors referenced to intercommunication segments of the real-time operating system. These communication descriptors are interruptable identically to the system table descriptors that are contained in the system table memory and are referenced to the intercommunication segments and under which are situated at least a code segment descriptor for the access onto the code segment of the sluice sub-system.

It also contains a status segment descriptor for the access onto a status segment in the real-time operating system that is assigned to the sluice sub-system, and a data segment descriptor for the access onto an intercommunication data segment. The intercommunication data segment intermediately stores the input information required by each of the two operating systems for a transition from one operating system to the other operating system and further contains a data field for the acceptance of messages from one operating system that can be exchanged with program sub-systems of the other operating system.

Control instructions are provided in the sluice sub-system such that for activation of the sluice sub-system in the real-time operating system, an allocation switch of the system processor from the system table memory onto the module table memory occurs, and, upon call-in of the status segment descriptor, a process switch into the interrupt transition routine subsequently occurs, this being terminated thereupon.

Control instructions are provided in the interrupt transition routine such that upon activation of the interrupt transition routine in the time-sharing operating system, a process switch into the sluice sub-system occurs upon call-in of the communication status segment descriptor.

Further control instructions are provided in the sluice sub-system such that an allocation switch of the system processor from the module table memory to the system table memory occurs before the sluice sub-system in the real-time operating system is deactivated.

The application module, like the switching unit and further function modules, particularly an organizational data server unit, have access via a common system bus to central organizational and/or dependability equipment. An alternatively selectable, further module table memory is provided in addition to a further system table memory that contains real-time interrupt descriptors for stimuli (e, f, g) associated with the real-time operating system. These real-time interrupt descriptors refer to interrupt routines pertaining to the real-time operating system. The alternatively selectable, further module table memory contain time-sharing interrupt descriptors for stimuli (x, y) associated with the time-sharing operating system. These time-sharing interrupt descriptors refer to interrupt routines pertaining to the time-sharing operating system. The further module table memory contains interrupt descriptors for stimuli (e, f, g) associated with the real-time operating system. There interrupt descriptors refer to the interrupt transition routine. The further system table memory contains interrupt descriptors for stimuli (x, y) associated with the time-sharing operating system, these interrupt descriptors referring to an interrupt rescue routine (IRR) in the real-time operating system.

The interrupt rescue routine deposits stimuli (x, y) associated with the time-sharing operating system into the intercommunication data segment. The stimuli (x, y) stored by the interrupt rescue routine in the intercommunication data segment are identified in the interrupt transition routine.

Control instructions are provided in the sluice sub-system such that an allocation switch between a further module system table memory occurs for every allocation switch between module table memory and system table memory. The program sub-system fashioned as sluice sub-system (SUB) in the real-time operating system is accorded a relatively low priority. An idle program sub-system of the real-time operating system is fashioned as sluice sub-system.

The data field contains messages that can be exchanged between the information transport system and the time-sharing operating system. A transition from the time-sharing operating system into the real-time operating system is respectively initiated by a periodic stimulus pertaining to the real-time operating system, this stimulus leading to a read-out of the messages stored in the data field into the respective input and output memories associated with the program sub-systems. In the course of a priority-suited, successive activation of all program sub-systems, the data respectively transferred from the data field into the corresponding input and output memories are processed by the program sub-system. The data field is fashioned as a dual port memory for messages of the program sub-systems of, first, the real-time operating system and of the program sub-systems of, second, the time-sharing operating system.

A critical advantage of the present invention is that the time sharing operating system almost completely uses the computer performance of the module communication system that represents the starting point of the invention and, apart from memory requirements for program sub-systems and data files, in particular, requires no additional requirements or modifications of hardware components.

For example, the UNIX operating system comes into consideration as the time sharing operating system introduced in the form of the application module, extensive documentation for this UNIX operating system being known in the prior art.

The critical structure feature of the present invention is the data field provided in the intercommunication data segment for the acceptance of, among other things, messages that can be interchanged with the information transport system. The data structure of the data accepted in this data field can be selected with the same data structure of the interface between an operating system bus and modules of the communication system, particularly between an organizational server and data server and the switching module. The data field of the intercommunication data segment thus has the character of an interface and thus predominately serves for the exchange of messages and jobs with the information transport system of the real-time operating system.

What is to be considered as a further important structure feature in this context is that all program sub-systems that can be reached, i.e. that should be addressable by both the real-time operating system as well as by the time sharing operating system are assigned two identification addresses. Messages proceeding from a process sequencing under the time sharing operating system are thus possible to all program sub-systems of the communication system. In the real-time operating system, the data field of the intercommunication data segment, like the system bus interface (dual port RAM of an interface processor) is serviced by a clock program sub-system (clock task). The time sharing operating system uses the data field of the intercommunication data segment like an interface processor, i.e. such that jobs are received from a wait list (command queue) and jobs are deposited in a wait list (event queue).

The real time operating system and the time sharing operating system each have a separate table memory for storing descriptors.

So that a respective transfer between both operating systems is possible, specific descriptors are identically fashioned in both table memories (Global Descriptor Table). This is particularly true for the code segment descriptors of procedures that execute such a transfer.

Advantageous developments of the present invention derive from the subclaims and shall be commented on in part below.

An advantageous development of the present invention is a further integration step that is critical for the needs of practice in that the application module, like the switching unit and, as warranted, further function modules, particularly an organizational data server unit, have access via a common system bus to central operations-oriented and/or dependability-oriented equipment. A far-reaching integration of the application module into the operations-oriented performances of the communication system is thus possible. As a result of such an integration, for example, the following operations-oriented performance features can be made available for the application module or for the time sharing operating system:

1. Automatic Restart;
2. Program Introduction via a Loading Medium of a System Module, for example of a Data Server;
3. Configuring external memories (hard disks) allocated to the application module via an operations-associated terminal that is preferably connected to an organizational and data server;
4. Configuring the switching-oriented periphery of the application module via the operations-oriented terminal; and
5. Signalling hardware faults via the display means allocated to the switching module or an operations-associated terminal that is preferably connected to the organizational and data server.

The far-reaching integration into the dependability-oriented performances of the communication system makes it possible, for example, to make the following dependability-oriented performance features available for the application module:

1. Software error monitoring with the assistance of a watchdog process;
2. Hardware fault recognition and fault isolation for the external read-only memories allocated to the application module;
3. Possibility of parallel registration on read-only memories;
4. Routine tests of the entire hardware of the application module; and
5. Monitoring the application module with a central system dependability program module.

With respect to the transition from the real-time operating system into the time sharing operating system, what is achieved according to a further development of the present invention is that this junction transition is accorded a low priority in comparison to the priorities of the other program sub-systems. Thus time-critical functions of the real-time operating system are handled with priority over all functions of the time sharing operating system. A preferred possibility of according a defined priority is provided by the transition from the real-time operating system into the time sharing operating system occurring from an idling program sub-system (idle task).

To that end, it may be necessary that the idle task established in the real-time operating system be modified. This modification principally serves for the realization of the following operations:

1. Change of allocation of the system processor means from the system table memory onto the table memory of the application module;
2. Task switch onto a task status segment of the application module; and
3. In the application module, the task switch leads to an interrupt transition routine, since the application module has been transferred to real-time operating system via an interrupt that activates this interrupt transition routine. A call-in of a "interrupt identification" in which the interrupt stored for the application module are handled follows the interrupt location (task switch from real-time operating system) in this interrupt transition routine.

The transition from the time sharing operating system into the real-time operating system is preferably initiated by a periodic interrupt process during which the read-out of the data established in the data field of the intercommunication data segment is into the respective input and output memory associated with the program sub-system. The messages output by the time sharing operating system are thus assigned to the associated program sub-systems of the real-time operating system and can be directly involved in the processing for activation of the respective program sub-systems.

The following explanation of an exemplary embodiment of the invention is referenced with respect to further advantages and features of the present invention as well as with respect to the advantageous developments thereof.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

An exemplary embodiment is based on a known communication system that has already been extensively described in the reference cited in the Background of the Invention with which line-switching functions as well as specific memory switching functions are combined in one concept.

Figure 1:
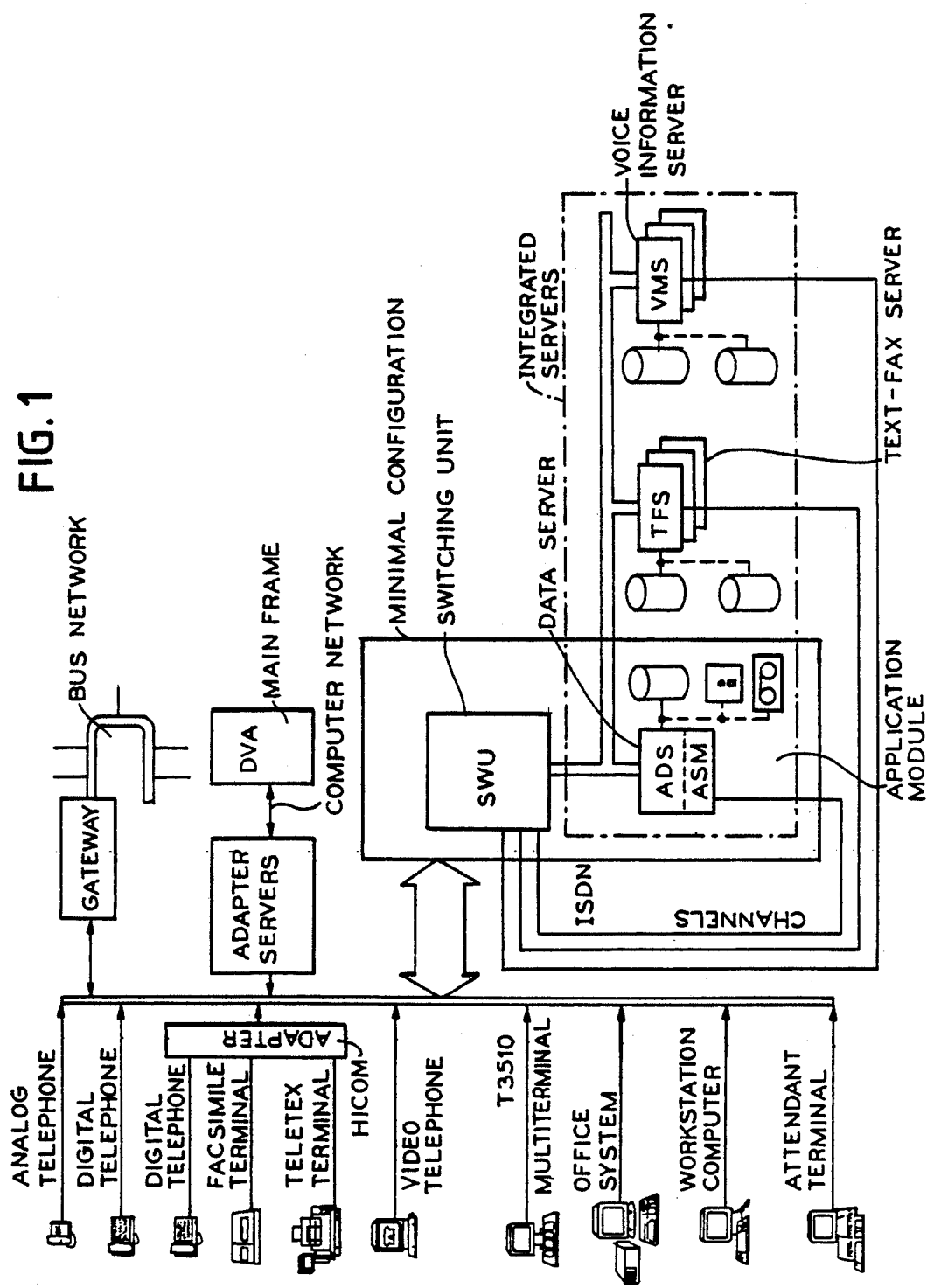
FIG. 1 is a schematic block diagram of an ISDN communication computer in combination with periphery equipment.

FIG. 1 schematically shows a communication computer together with a multitude of connectable equipment. The critical component parts of the communication computer are a switching unit SWU and an organizational data server unit ADS. These two units are supplemented by a voice information server unit VMS and by a text-fax server unit TFS. In addition, an application module ASM that is provided with a subscriber operating system is allocated to the organizational data server unit ADS.

The units SWU, ADS, VMS, TFS and ASM are to be fundamentally considered to be pure software modules, i.e. the illustration that has been selected is not bound to a defined type and distribution of hardware. In particular, the switching unit SWU, the organizational data server unit ADS and the application module ASM can have the same processor means allocated to them.

In a minimal configuration, this communication computer is functionally composed of only a switching unit SW for the through-connect switching functions and of an organizational data server unit ADS for the memory switching functions. In a standard stage of expansion of the communication computer which forms the basis of the following discussion, separate hardware is allocated to each of the two units, each of these separate hardware having the features of a microcomputer system.

Both system units are connected to one another, among other things, via a system bus for the purpose of collaboration.

Figure 2:
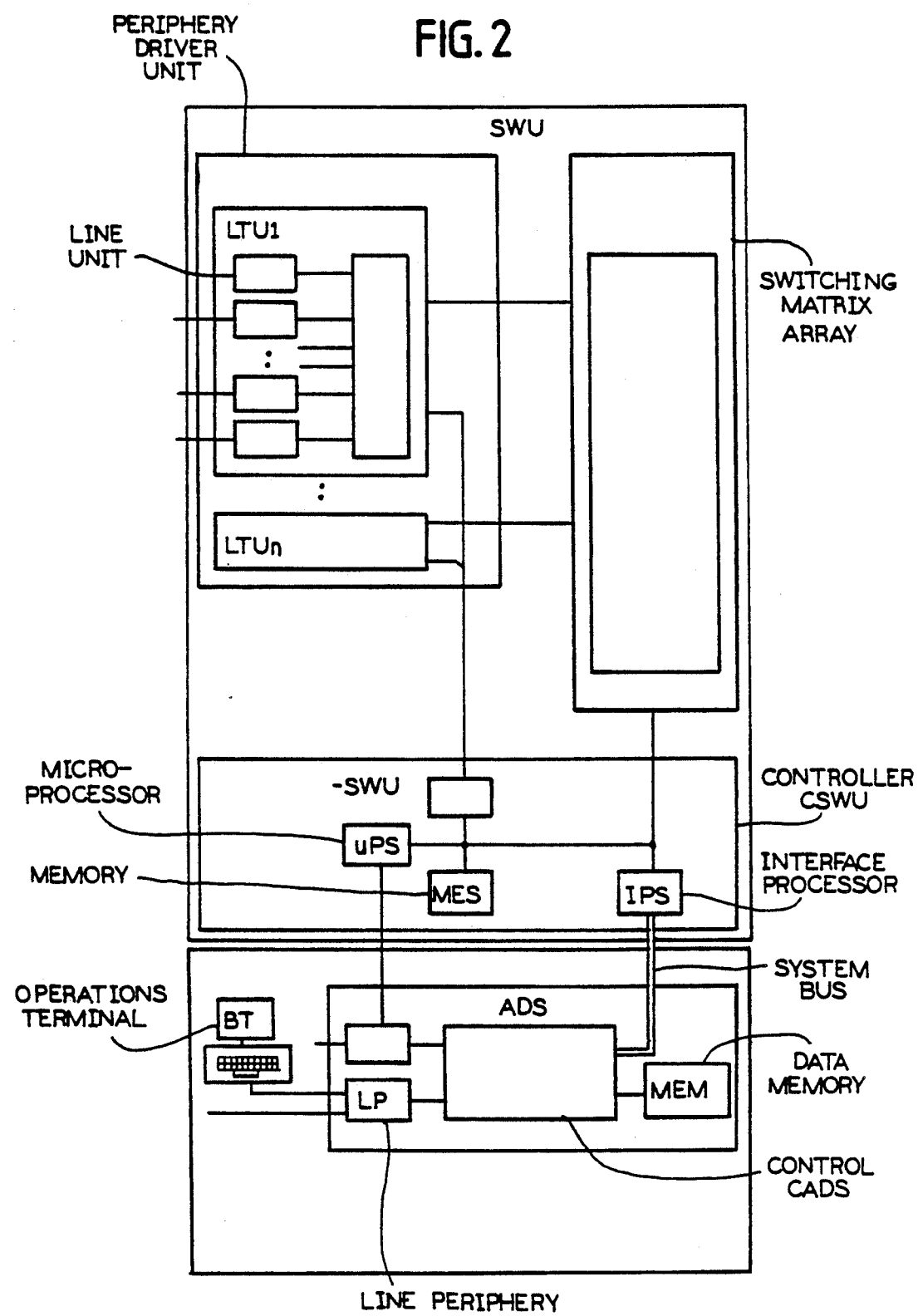
FIG. 2 is a block circuit diagram having the critical function components of the switching unit and of the organizational data server unit.

FIG. 2 shows a block circuit diagram of the communication computer in its minimal configuration having switching unit SWU and organizational data server unit ADS. As may be seen, the switching unit SWU is composed of three function units, namely a periphery driver unit having a plurality of line units LTU through LTUn, of a switching matrix array and of a controller CSWU.

A microprocessor UPS, a memory unit MES as well as an interface processor IPS are depicted as individual components of the controller CSWU.

The organizational data server unit ADS is essentially composed of a control unit CADS, of a data memory MEN and of line periphery LP. In addition, an operations terminal BT can also be connected to the organizational data server unit.

Figure 3:
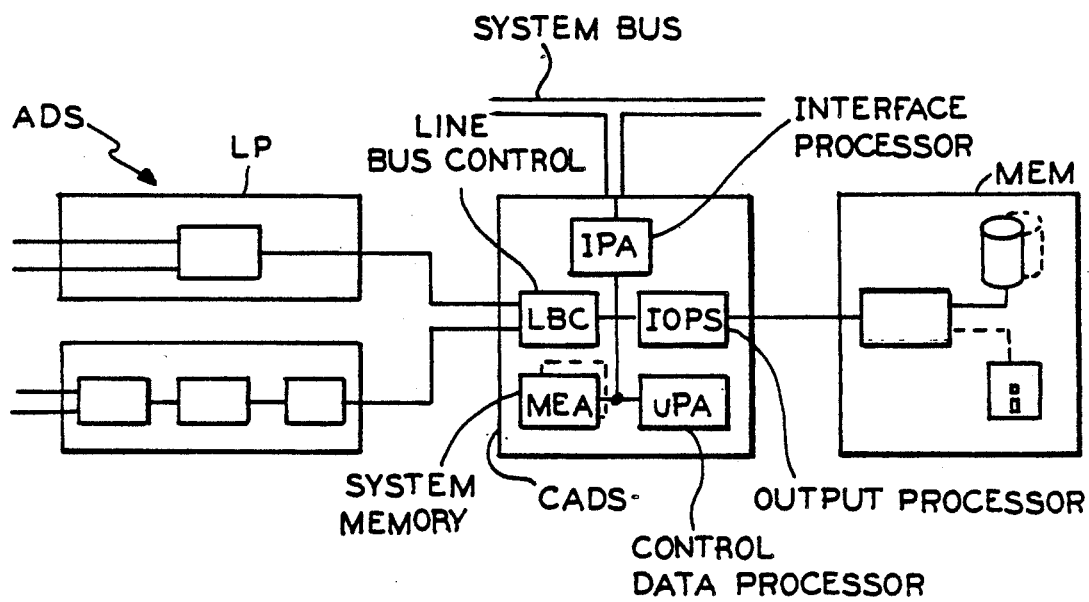
FIG. 3 is a block circuit diagram having the critical function components of the control of the organizational data server unit.

FIG. 3 shows the essential elements of the control unit CADS in a block circuit diagram. In detail, these elements are the central data processor UPA, a system memory MEA, a line bus control LBC for the line periphery LP, an output processor IOPS for the data memory MEM and an interface processor IPA for the system bus.

As the basis for a program-oriented realization of the functions in the switching unit SWU and in the organizational data server unit ADS, both system units comprise a separate operating system. The two operating systems, however, are coupled to one another via the system bus. Since short reaction times are generally required, both operating systems must be structured as real-time operating systems.

In comparison to the switching unit SWU that essentially only links the information paths and that plays a subordinate part in following operations, the organizational data server unit ADS represents a system unit that is additionally assigned the organization and control of the entire communication system.

The functions implemented to that end in the organizational data server unit ADS can be subdivided into a function complex associated with system operations and into various, optional data application functions. Included, for example, in the system-operations-oriented functions are commissioning the systems, the loading of system programs, the distribution and starting of these system programs, the activation or deactivation of system functions, as well as the acquisition of all operational modifications.

In the area of the data application functions are data transport functions for a transport of different types of data such as call charge data, system user data files between the communication system and other data manipulation systems, as well as similar data acquisition functions, for example calculating call charges or traffic statistics data and data manipulation functions, such as an editing of identified data.

A plurality of programs are kept ready for the execution of functions, these programs being supplied for handling as needed to the central processor unit uPA in the organizational data server unit ADS. Since as a rule a plurality of functions can simultaneously be pending for execution, a program, namely the aforementioned operating system, higher-ranking than all programs sees to an administration of the central processor unit uPA.

The operating system installed in the organizational data server unit ADS is designed for on-line system and real-time processing such as, for example, the known operating systems iRMX286.

Figure 4:
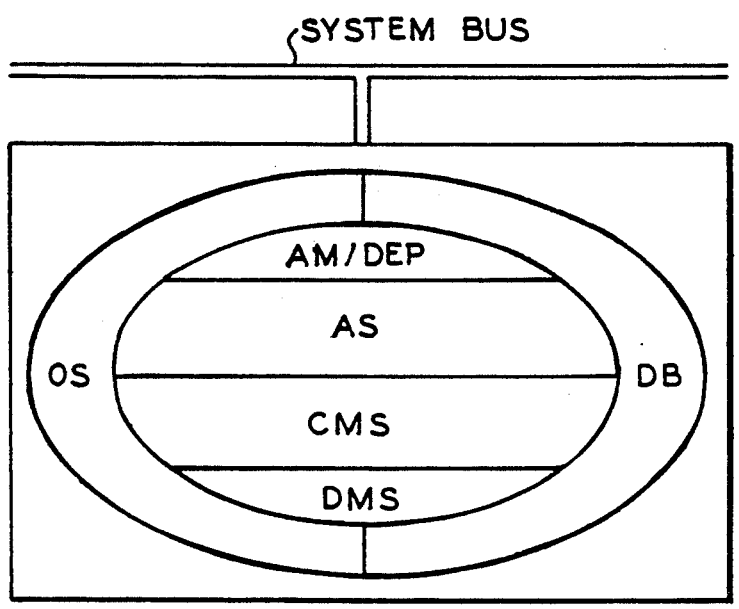
FIG. 4 is a diagram depicting an existing software architecture of the organizational data server unit.

The software architecture in the ADS control unit is illustrated in FIG. 4 with reference to a shell model. Situated under the administration of the operating system OS is an operations-oriented and dependability-oriented software complex AM/DEP, a user system AS that executes the actual memory switching function, a communication control system CMS for the execution of standardized communication protocols and a data file administration program DMS. A common data base DB is accessible to all of these systems.

In contrast to the operating systems that are designed for subscriber operations, for an on-line system individual user groups of a system work on a solution of tasks of the same task field in accordance with the definition thereof. Only data and control instructions are thereby input via control equipment, whereas the handling programs are already stored in the processor system. By contrast, with a subscriber operating system, also referred to as a time sharing operating system, tasks that are independent of one another can be handled from individual terminals. Every user has separate input/output equipment at his command as a connecting element to the processor system. From this equipment, he can input his programs as well as his data and control instructions.

Why an operating system for an on-line system is introduced into the communication system becomes clear in view of a uniform output area when one looks at the tasks required of a communication system, these, as known, being through-connect and memory switching.

This fact represents the reason that the computer capacity present in a communication system was hitherto available only for the switching-associated tasks even though these did not frequently make use of the full computing capacity.

In order to give the users of a communication system the possibility of individual creation and manipulation of data on a computer system, it was hitherto necessary to either make separate intelligent computers in the fashion of personal computers available to the users or to connect simpler data stations via the communication system to a central, independent data processing system that, of course, operates in a time-sharing environment.

In the communication system of the present invention, the functions of such a data processing system are integrated in the existing communication system in terms of software. Given unmodified hardware, the communication system then also fulfills the tasks of a data processing system in a time-sharing environment in addition to fulfilling the switching-oriented tasks.

The calculating capacity connected therewith that is additionally required can only be produced by the organizational data server unit ADS since the switching unit SWU forms an autonomous function complex that is self-contained. In order to additionally provide a time-sharing environment the time-sharing operating system administering the central data processor of the organizational data server unit ADS is modified such that, first, it still guarantees the switching-associated functions in conjunction with the switching unit SWU and, second, permits the desired time-sharing environment. Since both operating modes are fundamentally independent of one another and, moreover, a highly comfortable and known operating system is advantageous in the interests of the user for the time-sharing environment, the functions of the existing (time-sharing operating system) real-time operating system, for example iRMX, are augmented by those of an autonomous time-sharing environment (time sharing operating system, for example UNIX or a modification of UNIX).

Although both operating systems are provided for a sole administration of a central data processor in terms of their concept, a special microprocessor, for example INTEL No. 80286 or 80386, makes it possible for central data processor PA to couple the operating systems in program-oriented terms without significant modifications such that the calculating capacity of the central data processor uPA is accessible to both operating systems.

In this program-oriented coupling, the central data processor uPA is successively assigned to respectively the one or to the other operating system in chronological succession. Within what are referred to as multi-tasking operating systems such as, for example, iRMX, an allocation of the central data processor also is provided for program sub-units that are also referred to as program sub-systems or, frequently, as tasks or processes.

Such tasks represent software units composed of program code and data that are assigned a specific function and enable a structured formatting of an operating system.

Every task in an operating system is usually assigned what is referred to as a priority value that expresses the importance of a respective task and is decisive for the allocation of the central data processor in competition with other tasks.

In an operating system (for example, iRMX) provided for real-time processing, tasks for time-critical applications are provided with correspondingly high priority values in order to obtain an optimally immediate allocation of the central data processor as needed.

That part of the operating system that coordinates the allocation of the tasks and that defines an execution sequence of the tasks according to their priority values is called a task scheduler.

When the central data processor is assigned a task by the task scheduler, the task can keep the central data processor until either a higher-priority task asks for the allocation of the central data processor or until the task itself releases the central data processor. The latter also particularly applies when a task requires information to be produced by other tasks for handling its jobs and must wait for the arrival of such information.

At an arbitrary point in time, thus, every task of an operating system is situated in exactly one of essentially three operating statuses that are referred to as "ongoing", "ready" and "asleep". That task that has the central data processor momentarily allocated to it, accordingly, is ongoing. All tasks that are competing for allocation of the central data processor are ready and those tasks that are waiting for the arrival of specific results are asleep.

An additional, so-called idle task is usually also provided in the multi-tasking operating system, this idle task not having any specific function but never being asleep. Since it has the lowest priority value, it will be ongoing only when all other tasks are asleep.

According to an advantageous development of the present invention, the idle task present in the real-time operating system of the communications system is modified such that, in the "ongoing" condition, it transfers the central data processor uPA to the time-sharing operating system on its own, i.e. without operating system control. The idle task thus forms a type of sluice with whose assistance the central data processor uPA can be taken from the real-time operating system and, of course, can also be given back to it.

As seen from the standpoint of the two operating systems, this sluice is not present, for which reason each of the operating systems assumes an administrative power over the central data processor uPA that it enjoy exclusively.

A transfer of the central data processor must thus occur at a command level and data level that is unseen for the two operating systems and that directly interacts with the central data processor. For use of a microprocessor of the type 80286/80386 as central data processor uPA, the measures required for a realization of such a transfer are substantially reduced, since the hardware architecture of this microprocessor is already specialized use in multi-tasking operating systems.

A multi-stage and table-oriented addressing method is thus realized in this microprocessor for the formation of physical addresses. The fundamental principle of this method is that functionally interrelated memory blocks that are referred to below as segments are addressed in the address region of the main memory via descriptors and an unambiguous allocation of these segments to individual program packets such as, for example, tasks are supported in terms of hardware.

A table that is referred to as a Global Descriptor Table GDT is established in the main memory of the microprocessor for the addressing of the segments. This table GDT has a plurality what are referred to as descriptors. The descriptors essentially represent an absolute address and length value with which the initial address and the length of a memory block in the address region of the microprocessor is unambiguously defined. A respective location number is unambiguously allocated to each of the descriptors within the GDT.

Descriptors are differently designated depending on their use. Thus, data segment descriptors are provided that define memory blocks in which only data reside or code segment descriptors are provided for memory blocks in which only program code is deposited.

However, there are also what are referred to as system segment descriptors that define initial address and length of memory blocks that are in turn constructed as a table similar to the GDT.

A distinction is made among the system segment descriptors between local descriptor table descriptors LDTD and task status segment descriptors TSSD. A local descriptor table descriptor LDTD defines a memory block that is called a local descriptor table LDT. A local descriptor table LDT in turn contains descriptors whose structure corresponds to those of the GDT; however, no system segment descriptors are possible in an LDT.

A task status segment descriptor TSSD defines what is referred to as a task status segment TSS that is likewise constructed as a table but is mainly reserved for storing internal microprocessor register contents. Moreover, an indicator, also referred to as LDT selector is present in every task status segment TSS, one of the LDTs defined by the GDT being allocated to the associated TSS via this indicator. The LDT selector represents the location number in the GDT of the local descriptor table descriptor that defines the allocated LDT.

Internally, the microprocessor itself makes a plurality of hardware registers available that, for a relative address, provide a dynamic allocation of the relative address to a segment, so that an absolute address can be formed via which a memory cell in the address region of the microprocessor is then selected.

For every command that the microprocessor finds for execution, one of a plurality of what are referred to as segment registers is unambiguously selected according to an established rule. Either a location number of a GDT or a location number of an LDT resides in the segment registers.

Since, as seen from the standpoint of the microprocessor, only one GDT is present whose absolute initial address and length can be set in what is referred to as a Global Descriptor Table Register GDTR internally in the microprocessor, an associated descriptor in the GDT is immediately selected with a location number in the GDT. Since no location numbers for system segment descriptors are given out, the descriptor selected via the location number, as segment descriptor, indicates the initial address and length of that segment in which a relative address potentially connected with the underlying command is to be addressed.

When a location number of an LDT is indicated in a selected segment register, a determination must first be made to see in which of the LDTs the location number should select a segment descriptor.

As already mentioned above, the microprocessor 80286/80386 is well-suited as a central processing unit in combination with multi-tasking operating systems. A distribution of the shared jobs of the operating system onto different software packets, what are referred to as tasks whereof only exactly one is ongoing at any arbitrary point in time, can be promoted by the microprocessor in such fashion that every task is assigned a separate task status segment TSS in which task-associated information and a reference to data and code segments belonging &o the appertaining task are deposited.

Since the microprocessor always requires only the task status segment TSS belonging to the momentarily ongoing task and the task status segments belonging to the other tasks are of no consequence, what is referred to as a task register TS is provided in the microprocessor in hardware terms, the location number in the GDT that the task status segment descriptor TSSD that belongs to the momentarily ongoing task has residing in this task register TS.

With the selection of a task status segment TSS as a current task status segment, a current LDT is selected with the LDT selector deposited in the appertaining task status segment. The LDT selector represents that location number in the GDT to which the local descriptor table descriptor LDTD defining the current LDT belongs.

The current LDT is determined by the microprocessor for selection of a current task status segment via an internal local descriptor table register LDTR in which the LDT selector taken from the current task status segment is entered.

When, thus, a location number in an LDT is loaded into a segment register, then the current LDT is always meant, the associated location number, analogous to the GDT, then referencing a segment descriptor therein.

When a task that was hitherto ready should become ongoing and the task that was previously ongoing should become ready or asleep, a task switching, also referred to as task switch or process change, is provided in the microprocessor in terms of hardware. In this task switching, the internal processor control deposits the data belonging to the hitherto ongoing task are deposited in the task status segment belonging to the task and that data is replaced by the data belonging to the task that is now ongoing. The task register TR and the local descriptor table register LDTR are set to the current (task) status segment or to the current LDT.

For immediate handling of software and hardware events, a further table stored in the memory region, what is referred to as an interrupt descriptor table IDT, is made available to the microprocessor. References to all interrupt routines (also referred to as interrupt handlers) that come into consideration given the appearance of an event (also referred to as interrupt, stimulus or interrupt request) are stored in the IDT in the form of a respective location number in the GDT or an LDT and a relative address. The code segment descriptor that represents the address for a code segment containing a respective interrupt routine is situated under the appertaining location number in the GDT or an LDT. The associated relative address is the starting address of the interrupt routine within this code segment.

Upon appearance of an event, an identifier number that identifies the associated event is used as a location number in the IDT in order to select the interrupt routine belonging to the event via the GDT or an LDT.

For fixing the IDT in the address region of the microprocessor, the absolute initial address and the length of the IDT are set in an internal microprocessor register in what is referred to as the interrupt descriptor table register IDTR.

With the use of such addressing mechanisms controlled via tables, the idle task of the real-time operating system is fashioned as a sluice sub-system in the organizational data server unit ADS of the communications system in order to be able to make the central data processor uPA available to the time-sharing operating system and to the real-time operating system.

A prerequisite is that the critical parts of both operating systems, i.e. the operating system programs together with appertaining data, are deposited in the system memory MEA of the central data processor uPA. Since both operating systems have program structures that are independent of one another and are fundamentally autonomous, each of the operating systems has separate addressing tables in the form of exactly one GDT and IDT, respectively and also potentially has a plurality of task status segments and local descriptor tables LDT.

For purposes of better discrimination, the GDT allocated to the real-time operating system is also referred to as a system table memory and the IDT is referred to as a further system table memory. The GDT allocated to the time-sharing operating system is referred to as a module table memory and the IDT is referred to as a further module table memory.

So that an understanding of the program-associated measures leading to the present invention is not made unnecessarily difficult, the following shall proceed on the basis of a simplified concept wherein the plurality of task status segments of both operating systems is limited to respectively precisely one task status segment TSS, for which reason both operating systems are capable of being handled as respectively one task as seen from the standpoint of the microprocessor. A task switching within the individual operating systems is thus undertaken without the task-associated assistance of the 80286/80386 microprocessor hardware.

In addition to a multitude of descriptors associated to the operating system, shared descriptors, what are referred to as communication descriptors are also present in the system table memory (GDT of the real-time operating system) a well as in the module table memory (GDT of the time-sharing operating system), these communication descriptors being respectively represented in identical form in both GDTs. These shared descriptors are deposited under identical location numbers in the GDTs. As shared descriptors, a data segment descriptor, a status segment descriptor and at least one code segment descriptor are initially of interest.

The two shared data segment descriptors define exactly one data segment that shall be referred to below as an intercommunication data segment because it can be reached by both operating systems and can be utilized for data transfer.

The two shared code segment descriptors define a code segment in which program sequences are stored, these program sequences being executed for a transition from one operating system to the other. This code segment is essentially utilized by the idle task of the real-time operating system since the transition into the time-sharing operating system occurs for an ongoing idle task.

The two shared status segment descriptors define the task status segment that belongs to the real-time operating system. The location number of the shared status segment descriptors, together with the initial addresses and lengths of both GDTs and IDTs is stored in the intercommunication data segment from the real-time operating system. Moreover, the location number in the module table memory at which the status segment descriptor of the time-sharing operating system is stored is entered in the intercommunication data segment.

Since the central data processor uPA must be available to the real-time operating system for a commissioning of the overall communication system, it is assumed that all internal microprocessor registers are set in accordance with the demands of the real-time operating system before a first transition into the time-sharing operating system.

Special instructions to the central data processor uPA are contained in the code segment defined by shared code descriptors and belonging to the idle task of the real-time operating system, these special instructions being carried out for an ongoing idle task and preparing the transition to the time-sharing operating system.

Figure 5:
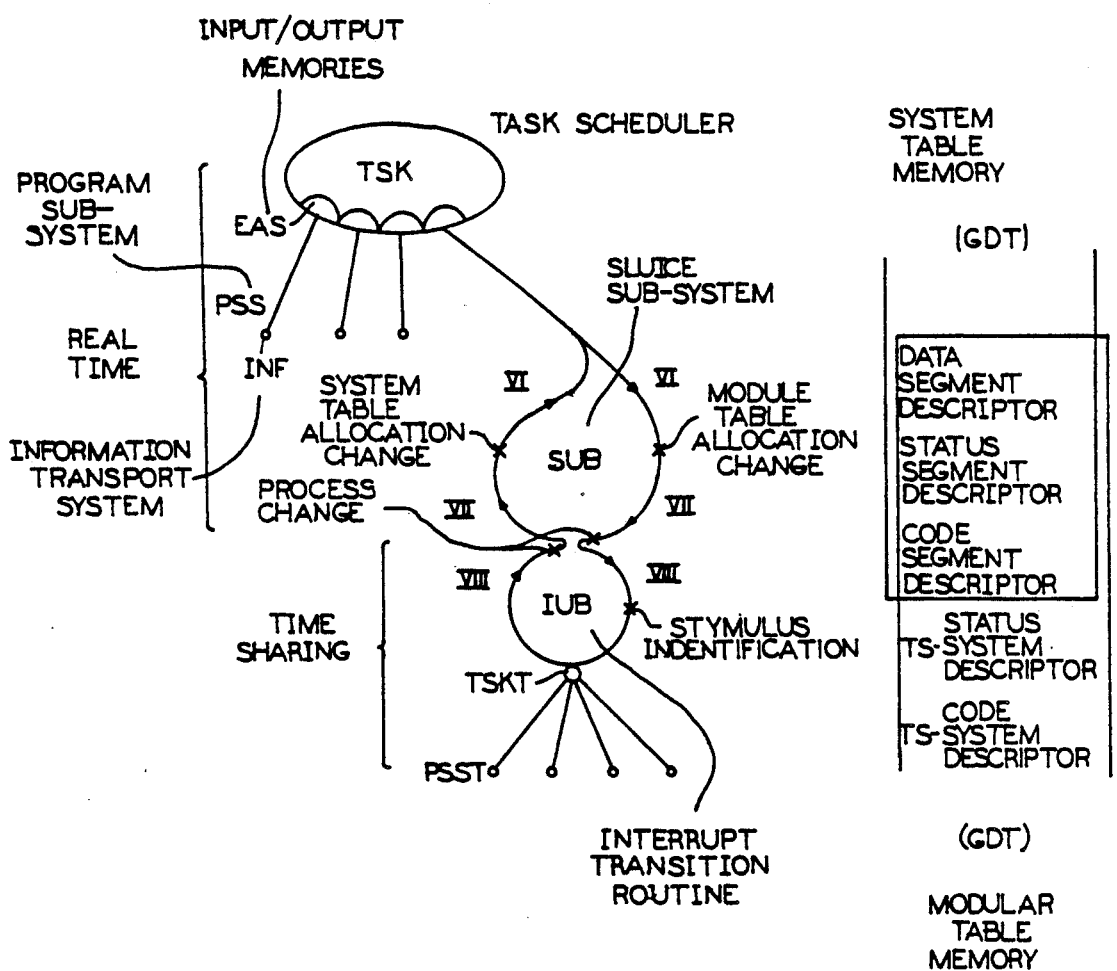
FIG. 5 is a diagram depicting the transition from one to the other operating system having the critical transition stages and markings VI through VIII allocated thereto.

With reference to a schematic sketch, FIG. 5 shows the program-oriented steps relevant for a transition from one operating system to the other in conjunction with the two operating systems. The upper part of the sketch illustrates the structure of the real-time operating system in highly schematic fashion with the task scheduler TSK and with a plurality of program sub-systems PSS that are bound thereto. Input and output memories EAS associated to program sub-systems are indicated within the task scheduler TSK, these input and output memories EAS being provided within the operating system for messages to the respective program sub-systems PSS. One of the illustrated program sub-systems PSS is fashioned as an information transport system INF resident in the operating system. A further program sub-system represents the idle task fashioned into the sluice sub-system SUB, this being symbolically illustrated in the form of a loop. The structure of the time-sharing operating system with task scheduler TSKT and associated program sub-systems PSST is shown in the lower part of FIG. 5, likewise in a highly schematic fashion. An interrupt transition routine IUB of the time-sharing operating system that serves for coupling to the sluice sub-system SUB is shown, likewise in the form of a loop.

The most important steps in a transition from one operating system to the other are marked by the numerals VI through VIII. For illustrating the descriptors in the system table memory and module table memory that are respectively relevant in the individual steps of the transition, these are schematically shown at the right-hand margin of FIG. 5 together with the essential descriptors.

Figure 6:
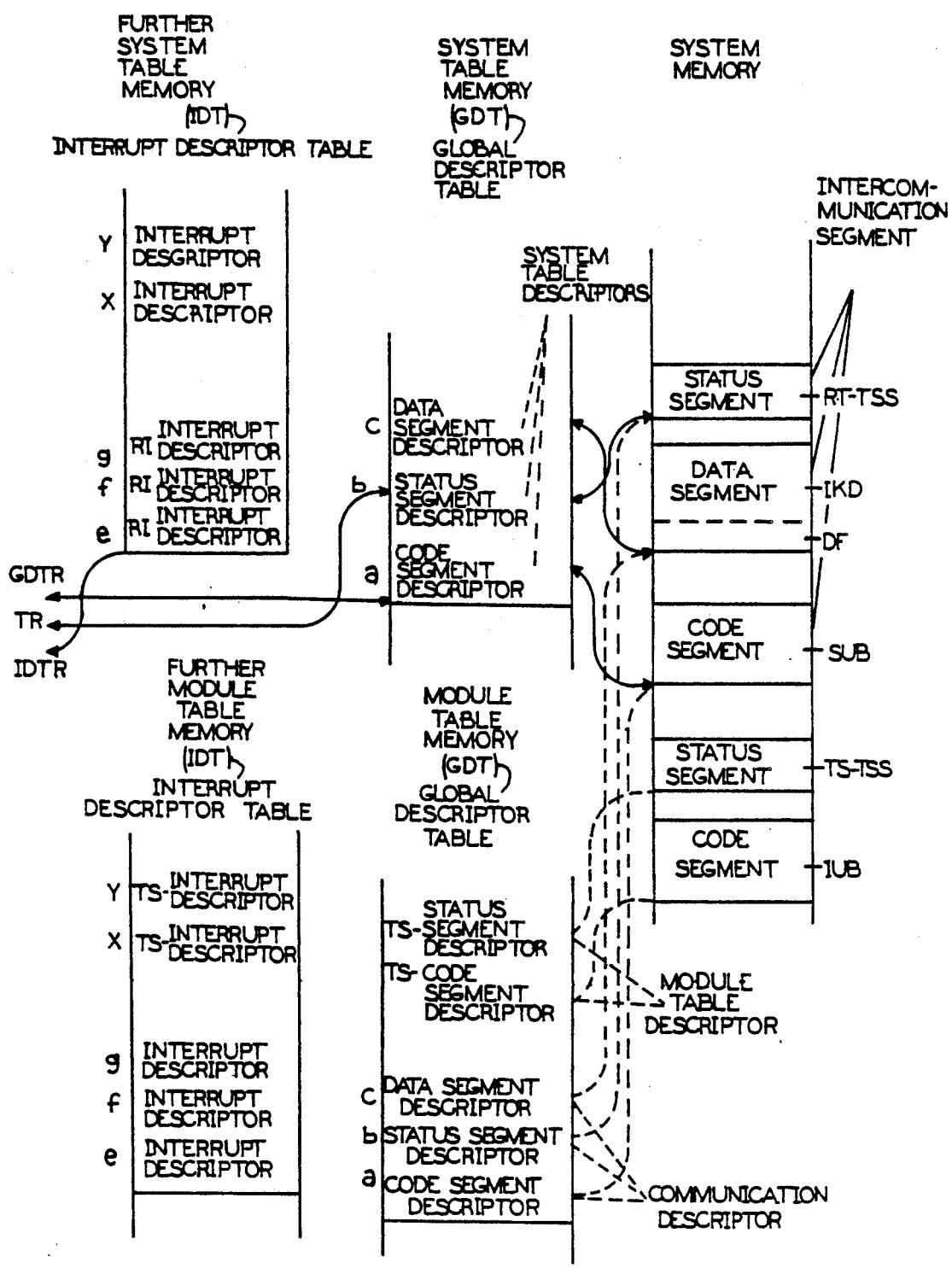
FIG. 6 is a schematic illustration of the relevant descriptors in the table memories and of the relevant segments in the system memory as well as with the relevant references at point in time VI according to FIG. 5.
Figure 7:
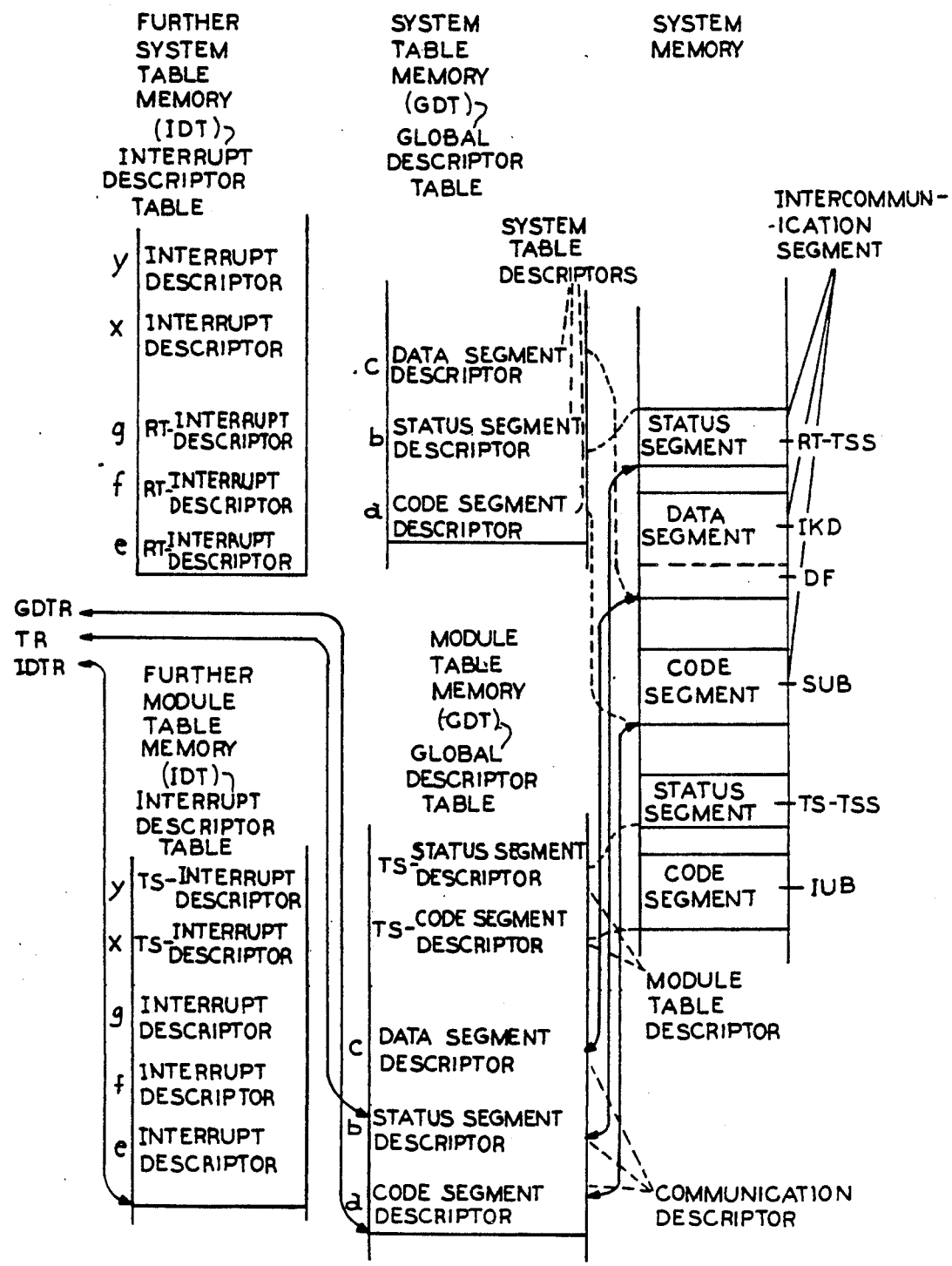
FIG. 7 is an illustration based on FIG. 6 having the references relevant at point in time VII according to FIG. 5.
Figure 8:
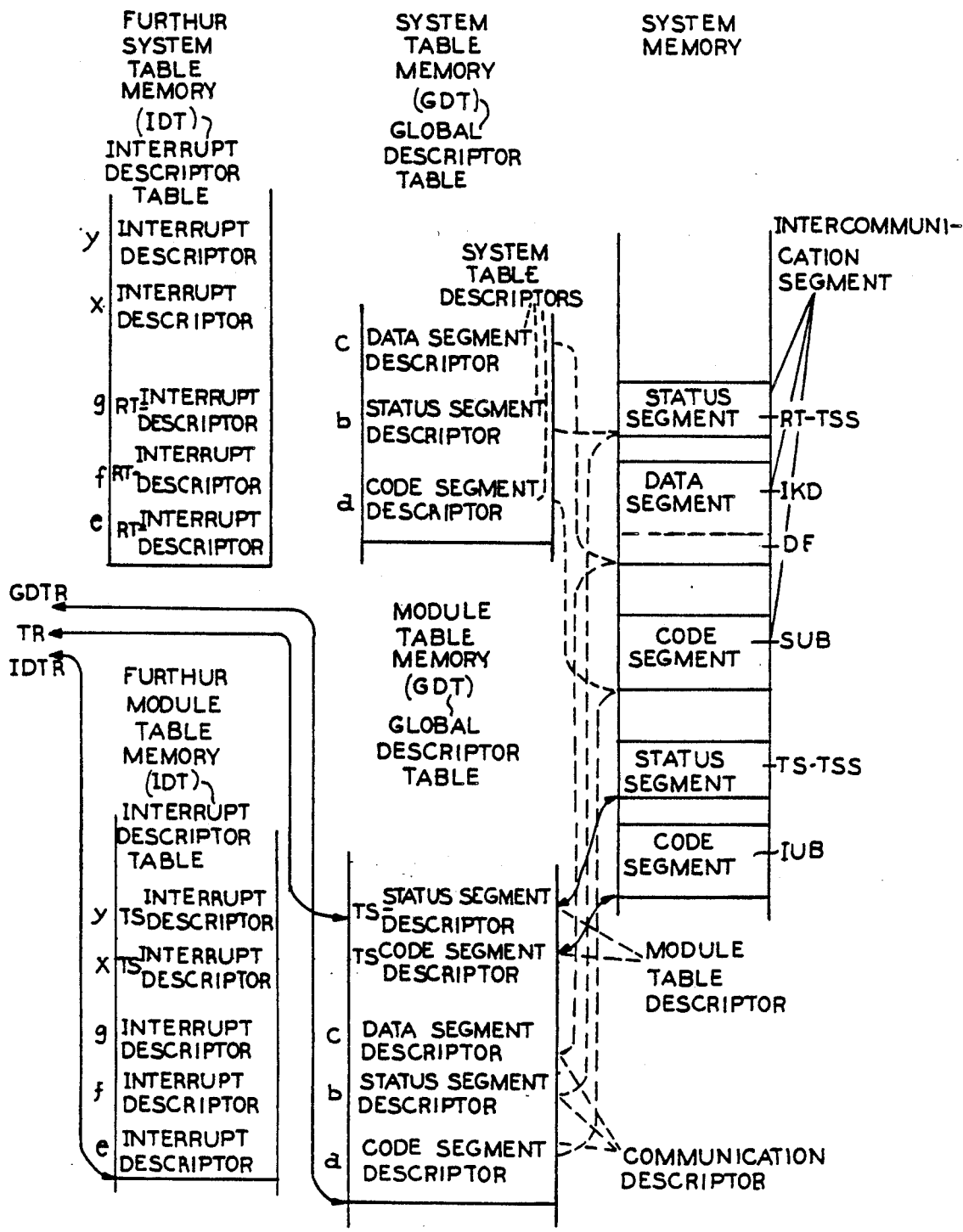
FIG. 8 is an illustration based on FIG. 6 having the references relevant at point in time VIII according to FIG. 5.

FIGS. 6 through 8 each schematically show the descriptors in the system or module table memories and the allocated memory segments in the system memory. The reference arrows represent the descriptor references that are respectively valid for the steps VI through VIII marked in FIG. 5.

As soon as it is ongoing, the first thing the program of the sluice sub-system SUB initiates (see the descriptor references shown in FIG. 6) is that the internal microprocessor interrupt descriptor table register IDTR and the Global Descriptor Table Register GDTR are overwritten with the initial addresses of the module table memory and of the further module table memory (GDT and IDT of the time-sharing operating system) that are stored in the intercommunication data segment IKD. The descriptor references shown in FIG. 7 are then applicable.

Since the shared descriptors in the module table memory are present for the code segment of the idle task SUB, for the intercommunication data segment IKD and for the status segment RT-TSS of the real-time operating system, the central data processor uPA continues to obtain its instructions from the code segment of the idle task.

Further, the program of the idle task initiates a task switching (process switch) onto the TS status segment descriptor of the time-sharing operating system whose location number (in the module table memory) is stored in the intercommunication data segment IKD. In this task switching that is triggered with a microprocessor branch instruction, the microprocessor automatically enters the microprocessor register contents belonging to the task of the real-time operating system, for example segment register, instruction counter, but not IDTR and GDTR, into the status segment RT-TSS of the real-time operating system and replaces them with the corresponding values from the status segment TS-TSS that belongs to the time-sharing operating system. The location number of the TS status segment descriptor belonging to the time-sharing operating system is entered in the task register TR. The descriptor references shown in FIG. 8 are then applicable.

After this task switching, the central data processor uPA obtains its instructions from a code segment belonging to the time-sharing operating system, since the segment registers were also newly loaded during the task switching.

In the strictest sense, this code segment belongs to the task scheduler TSKT of the time-sharing operating system and essentially contains the interrupt transition routine IUB that shall be discussed in yet greater detail below.

Internal task switches are carried out in both operating systems for the appearance of events that are communicated to the task schedulers in the form of hardware or software interrupts. For handling different interrupt sources, the task schedulers have what are referred to as interrupt routines that are selected on the basis of identifier numbers x, y, e, f, g that identify the interrupt and that are forwarded along with the appearance of an interrupt. Although both operating systems are controlled by hardware events in a certain sense, the real-time operating system must be capable of reacting immediately upon appearance of an event for the purpose of a real-time processing.

Assuming that the central data processor uPA is just momentarily allocated to the time-sharing operating system, the interrupt transition routine IUB of the time-sharing operating system is selected when an interrupt pertaining to the real-time operating system occurs. This interrupt transition routine IUB immediately initiating a transfer of the central data processor uPA back to the idle task SUB of the real-time operating system.

After depositing the identifier number that identifies the appertaining interrupt in the intercommunication data segment IKD, this interrupt transition routine IUB initiates a process switch onto the status segment descriptor of the real-time operating system. The location number of this status segment descriptor (in the GDTs) is stored in the intercommunication data segment IKD. The descriptor references shown in FIG. 7 are again applicable.

After this process switch, that is likewise triggered by a branch instruction of the microprocessor, the central data processor uPA again obtains its instructions from the code segment of the idle task fashioned as sluice sub-system SUB, namely from that location that follows the process switch to the time-sharing operating system.

What is then initiated at this point is that the registered contents of the GDTR, IDTR are again set to the values stored in the intercommunication data segment IKD and belonging to the real-time operating system. (The descriptor references shown in FIG. 6 are again applicable.) Subsequently, the identifier number stored immediately therebefore in the intercommunication data segment IKD by the interrupt transition routine IUB of the time-sharing operating system is read out and, after a potential recoding, is communicated to the task scheduler TSK of the real-time operating system in combination with potential software interrupts.

As a rule, the idle task is subsequently set into the "ready" status by the task scheduler.

For an active real-time operating system, of course, interrupts pertaining to the time-sharing operating system can also occur. These, however, are not capable of being immediately handled but their appearance has to be registered for an evaluation that is to be performed by the time-sharing operating system.

When an interrupt appears and in order to be able to immediately identify what operating system it belongs to, the identifier numbers x, y, e, f, g attached to the interrupts of the one operating system differ from those of the interrupt of the other operating system.

Since the identifier numbers of the interrupts are used as location numbers in an IDT in order to identify the branch destination of an interrupt routine allocated to a respective interrupt and since each of the operating systems has its own IDT, location numbers for interrupts intrinsic to the operating system as well as location numbers for interrupts alien to the operating system are provided in the IDTs of both operating systems.

Figure 9:
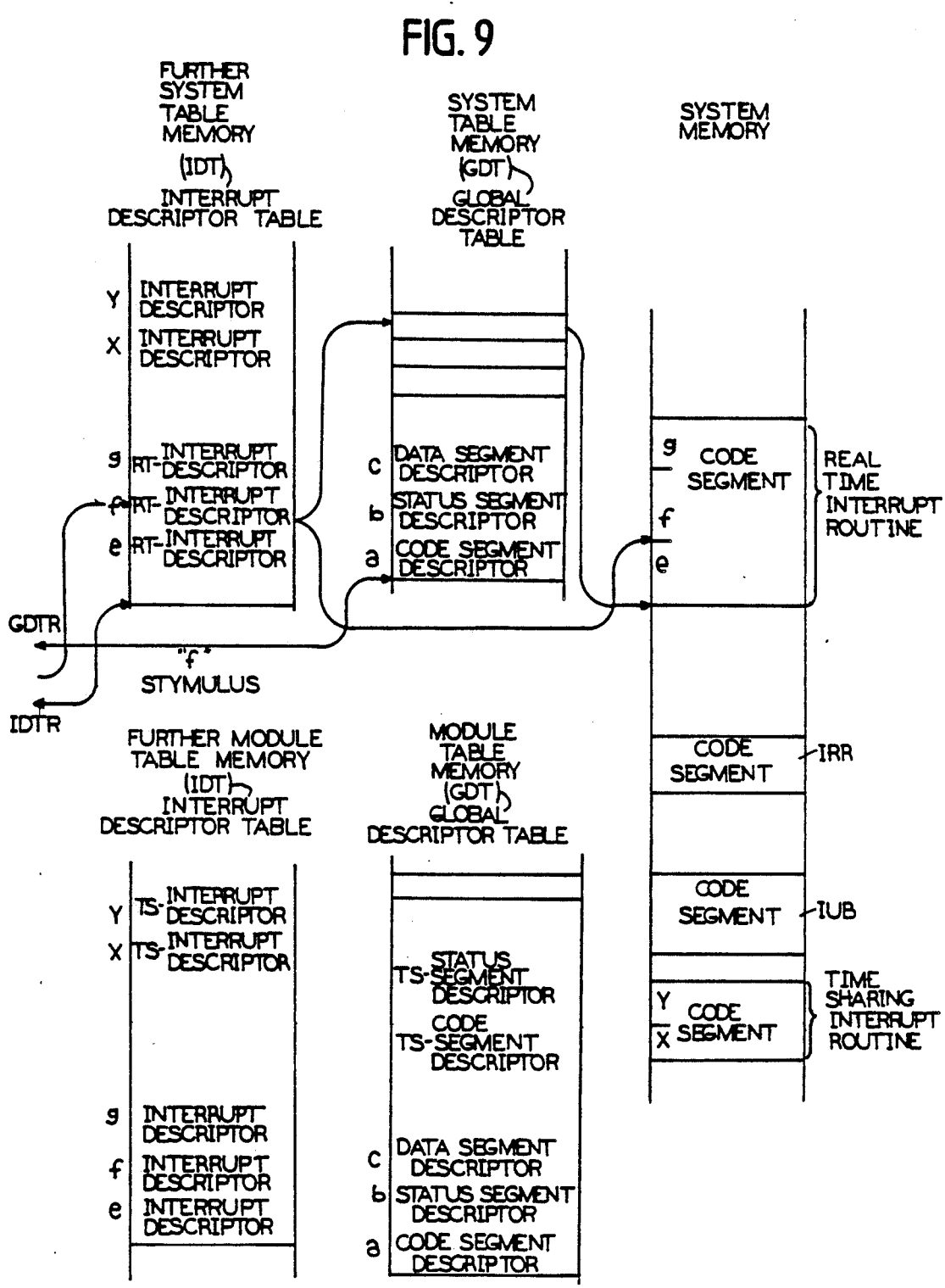
FIG. 9 is a schematic illustration of the descriptors relevant for an interrupt manipulation as well as of the references relevant for an active real-time operating system and an interrupt request belonging to this operating system.
Figure 10:
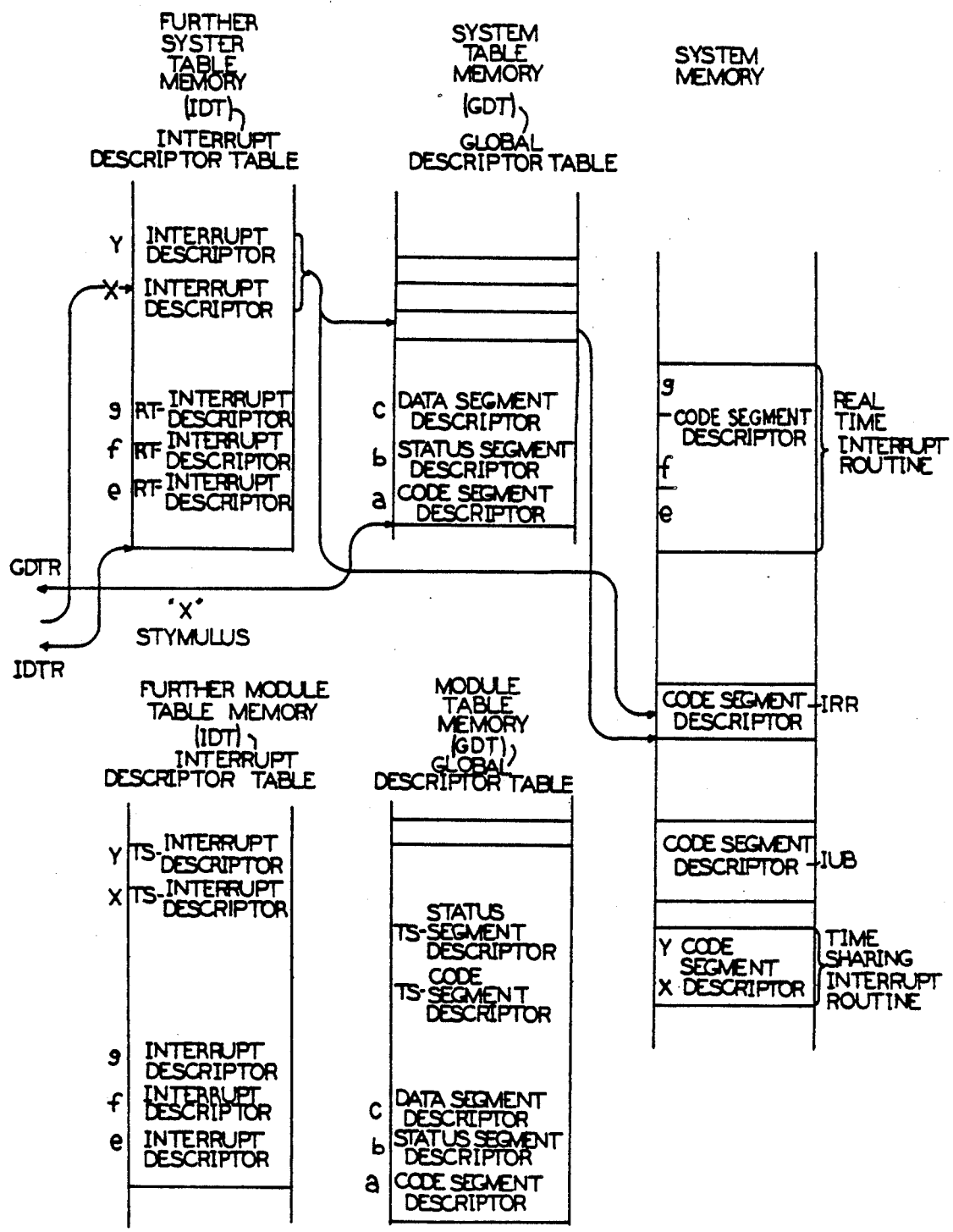
FIG. 10 is an illustration based on FIG. 9 having the references relevant for an active real-time operating system and for an interrupt request belonging to the subscriber operating system.
Figure 11:
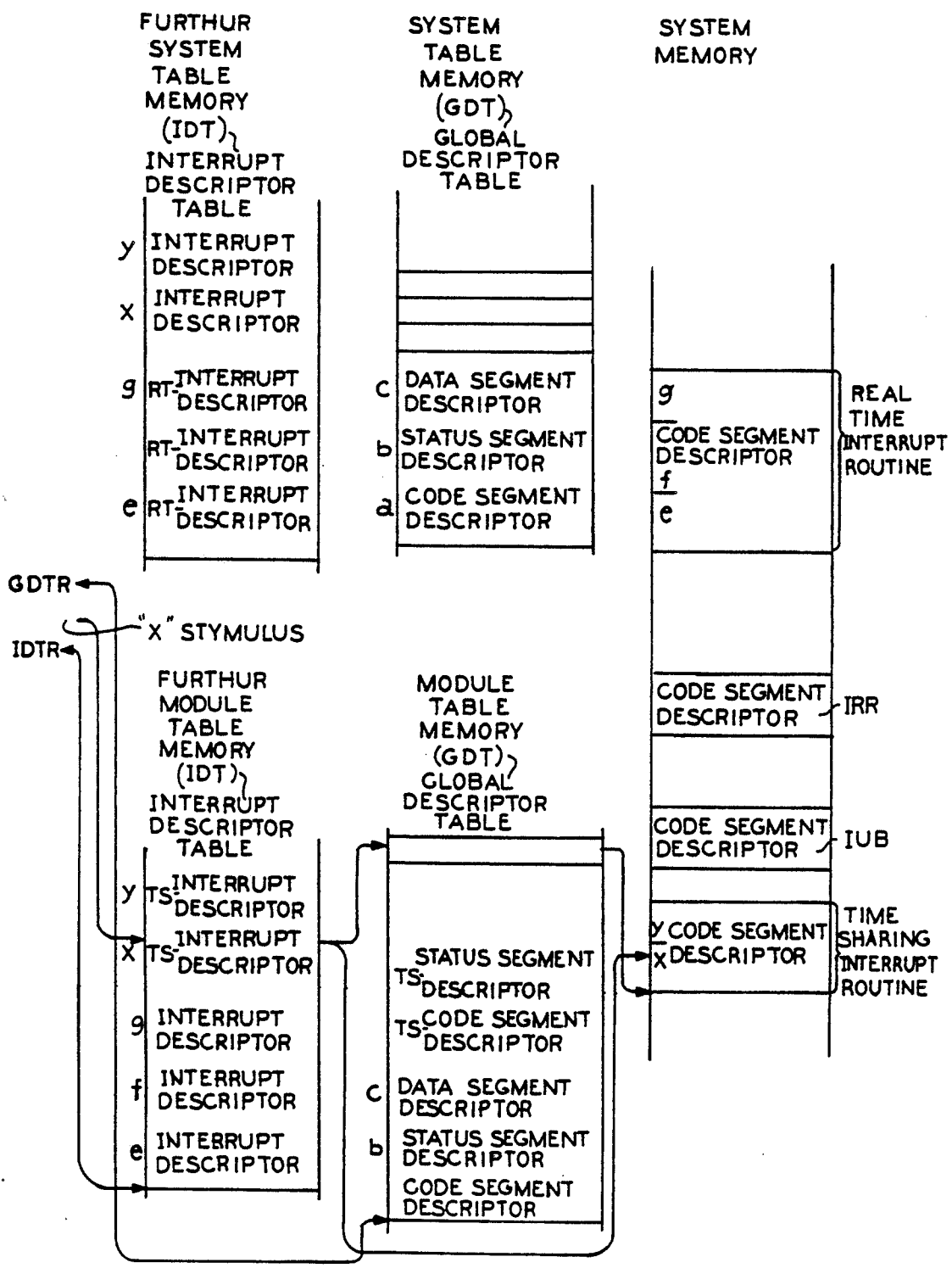
FIG. 11 is an illustration based on FIG. 9 having the references relevant for an active subscriber operating system and an interrupt request belonging to the real-time operating system.
Figure 12:
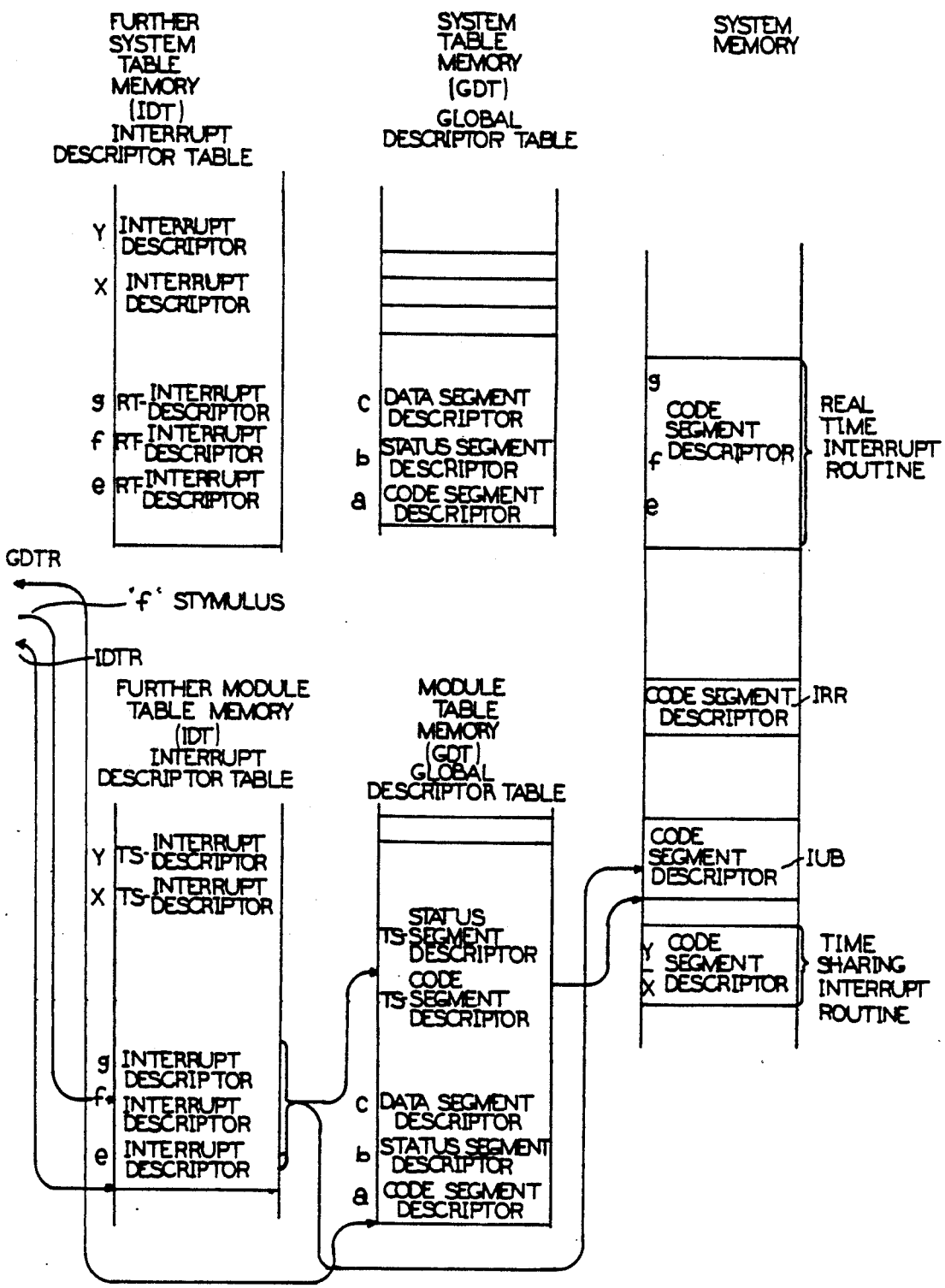
FIG. 12 is an illustration based on FIG. 9 having the references relevant for an active subscriber operating system and an interrupt request belonging to this operating system.

Schematic excerpts from the system or module table memories together with the descriptors therein that are relevant to an interrupt handling as well as their references to the various interrupt routines are respectively shown in FIGS. 9 through 12. The descriptor references shown in FIG. 9 are valid for system-intrinsic interrupts for an active real-time operating system and the descriptor references shown in FIG. 11 are valid for system-intrinsic interrupts for an active time-sharing operating system. For system-alien interrupts, the descriptor references shown in FIG. 10 are valid for an active real-time operating system and the descriptor references shown in FIG. 12 are valid for an active time-sharing operating system.

References to the interrupt routines associated with the operating system are stored in the two IDTs under the location numbers of the interrupts intrinsic to the operating system. However, references to a common interrupt routine IRR are stored in the IDT of the real-time operating system (further system table memory) under the location numbers of the interrupts alien to the operating system, this common interrupt routine IRR merely entering the identifier number x, y allocated to an interrupt into the intercommunication data segment IKD in response to an interrupt x, y (the descriptor references shown in FIG. 10 are applicable) associated with the time-sharing operating system for an active real-time operating system.

References to the interrupt transition routine IUB are stored in the IDT of the time-sharing operating system (further module table memory) under the location number e, f, g alien to the operating system. This interrupt transition routine IUB has already been mentioned; with a first program sequence, namely, it effects the transfer of the central data processor uPA to the idle task of the real-time operating system that is fashioned into the sluice sub-system SUB.

A second program sequence that follows this first program sequence is executed by the central data processor uPA immediately after a task switching to the TS status segment descriptor of the time-sharing operating system. This second program sequence is also referred to as interrupt identification since it is responsible for an evaluation of the identifier number of the interrupt x, y associated with the time-sharing operating system that is entered in the intercommunication data segment IKD by the interrupt rescue routine IRR of the real-time operating system.

Although both operating systems administer the same central data processor uPA, they are functionally independent of one another and the respective scope of their functions remains unaffected by the existence of the other operating system, the scope of the functions are even expanded.

The inventive involvement of a time-sharing operating system in an existing communication system having real-time on-line system, also provides functions that go beyond the operating system.

For the realization of such functions, a data field DF fashioned as a dual port memory is established in the intercommunication data segment IKD, a communication between the tasks of the one operating system and the tasks of the other operating system being possible in a certain sense.

Every ongoing task can deposit requests and messages for a task of the other operating system in this data field. Immediately after a transition into the other operating system, this data field DF is read out by the task scheduler TSK, TSKT of the appertaining operating system and potential requests encountered are handled as though they came from the intrinsic side of the operating system in that they are entered into the program-sub-system-associated input and output memory EAS that belongs to an associated task.

With requests to the task of the real-time operating system (information transport system INF eminent in the operating system) that is responsible for the transport functions, data files having arbitrary content, i.e. "program data" files as well as data "data files" can thus be transferred from the administrative authority of the one operating system into that of the other operating system.

An external storage medium, for example a hard disk of the data memory MEM, that can be accessed by both operating system is suitable for transferring the data files.

The invention is not limited to the particular details of the apparatus depicted and other modifications and applications are contemplated. Certain other changes may be made in the above apparatus without departing from the true spirit and scope of the invention herein involved. It is intended, therefore, that the subject matter in the above depiction shall be interpreted as illustrative and not in a limiting sense.

In order to provide specific examples of a realization for the program modules active during a transition from one operating system into another operating system, i.e. for the sluice subsystem SUB and the interrupt-transition-routine IUB, two corresponding program sequences in assembler language are listed below.

The first program sequence, "Task Switch from RMX to XENIX", represents the program of the sluice subsystem SUB, whereby the commands in code lines 48 and 49 cause the change of allocation to the modular table memory (see FIG. 5 between marked step VI and VII) and the commands in code lines 56 and 57 cause the change of allocation to the system table memory (see FIG. 5 between marked step VII and VI). The command in code line 50 executes the process alteration (see FIG. 5) to the Timesharing operating system.

The second program sequence, "Perform Task Switch to RMX", represents the program of the interrupt transition routine IUB in which the command in code line 46 triggers the process alteration (see FIG. 5) back to the Realtime operating system.

```
1  /**********************************************************/
2  /*                                                        */
3  /*    Task Switch from RMX to XENIX                       */
4  /*                                                        */
5  /*                                                        */
6  /*                                                        */
7  /**********************************************************/
8
9       PUSH   DS
10      MOV    AX, SEG X_CONF
11      MOV    DS, AX         ; load communication segment descriptor
12      MOV    BX, OFFSET X_CONF
13      CMP    WORD PTR[BX], 1 ; check if xenix is present
14      JNZ    NO_XENIX
15
16      MOV    BX, OFFSET X_TSS
17      CMP    WORD PTR[BX+2], 0 ; check xenix TSS
18      JZ     NO_XENIX       ; if 0 then quit
```

```
19
20       MOV    DI, OFFSET X_GDT
21       CMP    WORD PTR[DI],0   ; check xenix GDT
22       JZ     NO_XENIX         ; if 0 then quit
23
24       MOV    SI, OFFSET X_IDT
25       CMP    WORD PTR[SI], 0  ; check xenix IDT
26       JZ     NO_XENIX         ; if 0 then quit
27       JMP    GOTO_XENIX       ; jump to part performing task switch
28 NO_XENIX:
29       JMP    NO_XENIX_IDLE    ; don't perform task switch
30
31 GOTO_XENIX:
32       PUSH   BX
33       MOV    BX, OFFSET RMX_SS
34       MOV    [BX], SS         ; save rmx stack segment descriptor
35       MOV    BX, OFFSET XR_INT_LEVEL
36       MOV    WORD PTR[BX], 0  ; no interrupts are pending in rmx
37       POP    BX
38       CLI                     ; disable interrupts
39       MOV    AX, DS
40       MOV    SS, AX           ; load stack segment selector with ds
41       MOV    AX, 0
42       MOV    ES, AX           ; set ES to 0
43                               ; only DS/ and Cs/selector in both GDTs are
44                               ; identical
45       MOV    AX, SP           ; save stack pointer in AX
46       MOV    SP, 10H          ; ensure that sp is less than sslim
47
48       LGDT   [DI]             ; load Xenix GDT
49       LIDT   [SI]             ; load Xenix IDT
50       JMP    DWORD PTR[BX]    ; perform task switch to xenix
51                               ; task switch from xenix enters here
52       MOV    SP, AX           ; restore stack pointer
53       CLI                     ; disable interrupts
54       MOV    SI, OFFSET RMX_GDT
55       MOV    DI, OFFSET RMX_IDT
56       LGDT   [SI]             ; load rmx GDT
57       LIDT   [DI]             ; load rmx IDT
58
59       MOV    BX, OFFSET RMX_SS
60       MOV    SS, [BX]         ; restore stack segment register
61       STI                     ; enable interrupts
62
63       MOV    BX, OFFSET XR_INT_LEVEL
64                               ; interrupt handling of those interrupts
65                               ; received in xenix but belonging to rmx
66       TEST   WORD PTR[BX], Y_L_M1 ; check if the bit for the clock
67                               ; interrupt is set
68       JZ     INT_M5
69       INT    Y_L_M1_LEV       ; handle clock interrupt
70       AND    WORD PTR [BX], Y_L_M1_NOT ; reset clock bit
71 INT_M5: TEST  WORD PTR[BX], Y_L_M5 ; check if the bit for the IOPS
72                               ; interrupt is set
73       JZ     INT_M4
74       INT    Y_L_M5_LEV       ; handle IOPS interrupt
```

```
75          AND      WORD PTR [BX], Y_L_M5_NOT ; reset IOPS bit
76 INT_M4:  TEST     WORD PTR[BX], Y_L_M4 ; check if the bit for the NMI
77                                        ; interrupt is set
78          JZ       INT_M6
79          INT      2                    ; handle NMI interrupt
80          AND      WORD PTR [BX], Y_L_M4_NOT ; reset NMI bit
81 INT_M6:  TEST     WORD PTR[BX], Y_L_M6 ; check if the bit for the MPSC
82                                        ; interrupt is set
83          JZ       INTS_DONE
84          INT      Y_L_M6_LEV           ; handle MPSC interrupt
85          AND      WORD PTR [BX], Y_L_M6_NOT ; reset MPSC bit
86
87 INTS_DONE:    POP      DS
88          JMP      IDLE                 ; all interrupts handled
89                                        ; check for tasks ready.
90                                        ; if none are ready, perform task switch
91                                        ; to xenix again
92
93 NO_XENIX_IDLE: POP   DS                 ; no xenix, halt processor til the
94          sti                            ; next interrupt occurs
95          nop
96          hlt
97          nop
98          jmp      idle 1 ;********************************************************
 2 ;
 3 ;      Procedure in XENIX performing task switch to RMX.
 4 ;
 5 ;********************************************************
 6 ;
 7 ;      switchrmx - perform task-switch to RMX.
 8 ;
 9 ;********************************************************
10
11          PUBLIC _switchrmx
12
13
14 pBegin _switchrmx
15         PROFILE
16
17         cli                             ; disable interrupts
18         push     bx
19         push     cx
20         push     dx
21         push     si
22         push     di
23         push     es
24         mov      ax, COMM_SEL
25         mov      es, ax                 ; get selector of communication segment
26         mov      bx, X_INT_LEVEL        ;
27         mov      ax, _rmxints           ; get interrupts to be performed by rmx
28         mov      WORD PTR es:[bx], ax   ; store them in communication segment
29         xor      ax, ax                 ;
30         mov      es, ax                 ; store 0 in es for task switch
31         mov      dx, [_picimr]
```

```
32      in      al, dx                      ; get current PIC mask for xenix
33      xchg    al, ah                      ; store in ah
34      mov     al, _rmx_intmask            ; get rmx interrupt mask
35      or      al, _mpsc_mask              ; mask MPSC-int if MPSC is used by xenix
36      out     dx, al                      ; restore interrupt mask of RMX
37      mov     di, ax                      ; save both interrupt masks in di
38      mov     cx, sp                      ; save sp
39      mov     sp, 10H                     ; ensure sp < sslim for task switch
40      mov     si, offset _gdt + (CLDT_SEL and SEL_INDEX)
41      mov     ah, byte ptr [si+D_ACC]     ; save access rights of ldt selector
42      mov     al, DSA_TABLE               ;
43      mov     byte ptr [si+D_ACC], al     ; set access rights to read
44      sldt    bx                          ; store ldt selector in bx
45      lldt    _ldt_for_tss                ; load ldt selector for task switch
46      jmp     DWORD PTR _rmx_tss          ; task switch to rmx
47                                          ; entry point from rmx
48      mov     sp, cx                      ; restore sp
49      lldt    bx                          ; restore ldt selector of xenix
50      clts                                ; clear task switched bit
51      mov     byte ptr [si+D_ACC], ah     ; restore access rights of ldt selector
52      mov     ax, di                      ; store interrupt mask of xenix in ah
53      in      al, dx                      ; get interrupt mask of rmx
54      mov     _rmx_intmask, al            ; save rmx interrupt mask
55      xchg    al, ah                      ;
56      out     dx, al                      ; restore xenix interrupt mask
57      mov     ax, COMM_SEL                ;
58      mov     es, ax                      ; load selector of communication segm.
59      mov     bx, X_INT_LEVEL
60      mov     ax, WORD PTR es:[bx]        ; get rmx interrupts still pending
61      mov     _rmxints, ax                ; store in _rmxints
62      mov     bx, X_CLOCK_CNT
63      mov     ax, WORD PTR es:[bx]        ; get clock ticks missed by xenix
64      mov     WORD PTR es:[bx], 0         ; reset clock ticks counter
65      mov     bx, X_CONF                  ; check for shutdown request of rmx
66      cmp     WORD PTR es:[bx], X_CONF_RMX_REBOOT
67      jne     _hs_popes                   ; no shutdown, quit
68      add     _rmx_shutdown, 1            ; set flag to shutdown xenix
69 PUBLIC _hs_popes
70 _hs_popes:
71      pop     es
72      pop     di
73      pop     si
74      pop     dx
75      pop     cx
76      pop     bx
77      sti                                 ; enable interrupts
78      ret
79 pEnd _switchrmx
```

What is claimed is:

1. A modularly structured ISDN communication system, having at least one switching unit (SWU);
   (I) to which equipment and networks are connectable via periphery modules; and
   (II) that has a switching matrix array,
having a memory-programmed system processor (uPA);
   (I) that has a real-time operating system;
      (1) for controlling,
         (A) the access to the system resources,
         (B) the communication between program sub-systems (PSS; tasks), and
         (C) the reaction to stimuli (interrupt handling),
      (2) having an information transport system (INF) eminent in the operating system,
         (A) having program sub-system-associated input and output memories (EAS) operated mail-box-like for message to and from the program sub-systems (PSS),
having a system memory (MEA):
   (I) with memory segments addressable via descriptors for storing;
      (1) data files, and
      (2) the program sub-systems, having a system table memory that contains system table descriptors referenced to the memory segments of the real-time operating system,
comprising:
   an application module (ASM):
      (I) having a time-sharing operating system;
      (II) having a program sub-system (PSS) fashioned as a sluice sub-system (SUB);
      (III) having a module table memory selectable alternatively to the system table memory that;
         (1) contains module table descriptors referenced to memory segments of the time-sharing operating system under which at least,
            (A) a (TS) time-sharing status segment descriptor referenced to a status segment (TS-TSS) of the time-sharing operating system intermediately stores system process data,
         (2) contains a (TS) time-sharing code segment descriptor referenced to the code segment of an interrupt transition routine (RUB) of the time-sharing operating system,
         (3) and that further contains communication descriptors referenced to intercommunication segments of the real-time operating system, these communication descriptors being interruptable identically to the system table descriptors that are contained in the system table memory and are referenced to the intercommunication segments and under which are situated at least,
         (4) a code segment descriptor for the access onto the code segment of the sluice sub-system (SUB),
         (5) a status segment descriptor for the access onto a status segment (RT-TSS) in the real-time operating system that is assigned to the sluice sub-system (SUB), and
         (6) a data segment descriptor for the access onto an intercommunication data segment (IKD), whereby the intercommunication data segment (IKD),
            (a) intermediately stores the input information required by each of the two operating systems for a transition from one operating system to the other operating system and further
            (b) contains a data field (DF) for the acceptance of messages from one operating system that can be exchanged with program sub-systems (PSS, PSST) of the other operating system.

2. The modularly structured ISDN communication system according to claim 1, wherein,
   control instructions are provided in the sluice sub-system (SUB) such that:
      for activation of the sluice sub-system (SUB) in the real-time operating system, an allocation switch of the system processor (uPA) from the system table memory onto the module table memory occurs, and, upon call-in of the TS status segment descriptor, a process switch into the interrupt transition routine (IUB) subsequently occurs, this being terminated thereupon;
   control instructions are provided in the interrupt transition routine (IUB) such that:
      upon activation of the interrupt transition routine (IUB) in the time-sharing operating system, a process switch into the sluice sub-system (SUB) occurs upon call-in of the communication status segment descriptor; and
   further control instructions are provided in the sluice sub-system (SUB) such that:
      an allocation switch of the system processor (uPA) from the module table memory to the system table memory occurs before the sluice sub-system (SUB) in the real-time operating system is deactivated.

3. The modularly structured ISDN communication system according to claim 1, wherein the application module (ASM), like the switching unit (SWU) and further function modules, particularly an organizational data server unit (ADS), have access via a common system bus to central organizational and/or dependability equipment.

4. The modularly structured ISDN communication system according to claim 1 wherein an alternatively selectable, further module table memory is provided in addition to a further system table memory that contains (RT) real-time interrupt descriptors for at least stimuli (e, f, g) associated with the real-time operating system, these (RT) real-time interrupt descriptors referring to interrupt routines pertaining to the real-time operating system, said alternatively selectable, further module table memory containing (TS) time-sharing interrupt descriptors for at least stimuli (x, y) associated with the time-sharing operating system, these (TS) time-sharing interrupt descriptors referring to interrupt routines pertaining to the time-sharing operating system; wherein the further module table memory contains interrupt descriptors for stimuli (e, f, g) associated with the real-time operating system, these interrupt descriptors referring to the interrupt transition routine (IUB); and wherein the further system table memory contains interrupt descriptors for stimuli (x, y) associated with the time-sharing operating system, these interrupt descriptors referring to an interrupt rescue routine (IRR) in the real-time operating system.

5. The modularly structured ISDN communication system according to claim 4, wherein the interrupt rescue routine (IRR) stores stimuli (x, y) associated with the time-sharing operating system in the intercommunication data segment (IKD).

6. The modularly structured ISDN communication system according to claim 5, wherein the stimuli (x, y) stored by the interrupt rescue routine (IRR) in the intercommunication data segment (IKD) are identified in the interrupt transition routine (IUB).

7. The modularly structured ISDN communication system according to claim 1, wherein control instructions are provided in the sluice sub-system (SUB) such that an allocation switch between a further module system table memory occurs for every allocation switch between the module table memory and system table memory.

8. The modularly structured ISDN communication system according to claim 1, wherein the program sub-system fashioned as sluice sub-system (SUB) in the real-time operating system is accorded a relatively low priority.

9. The modularly structured ISDN communication system according to claim 1, wherein an idle program sub-system (idle task) of the real-time operating system is fashioned as sluice sub-system (SUB).

10. The modularly structured ISDN communication system according to claim 1, wherein the data field (DF) contains messages that can be exchanged between the information transport system (INF) and the time-sharing operating system.

11. The modularly structured ISDN communication system according to claim 1, wherein a transition from the time-sharing operating system into the real-time operating system is respectively initiated by a periodic stimulus pertaining to the real-time operating system, this stimulus leading to a read-out of the messages stored in the data field (DF) into the respective input and output memories (EAS) associated with the program sub-systems.

12. The modularly structured ISDN communication system according to claim 1, wherein, in the course of a priority-suited, successive activation of all program sub-systems (PSS, PSST), the data respectively transferred from the data field (DF) into the corresponding input and output memories (EAS) are processed by the program sub-systems (PSS, PSST).

13. The modularly structured ISDN communication system according to claim 1, wherein the data field (DF) is fashioned as a dual port memory for messages of the program sub-systems (PSS) of, first, the real-time operating system and of the program sub-systems (PSST) of, second, the time-sharing operating system.

* * * * *